July 2, 1946.　　　C. R. JOHNSON　　　2,403,286
DETONATOR LOADING MACHINE
Filed Dec. 18, 1943　　　6 Sheets-Sheet 1

Charles R. Johnson　INVENTOR.
BY Thos. A. Wilson
ATTORNEY

July 2, 1946.  C. R. JOHNSON  2,403,286
DETONATOR LOADING MACHINE
Filed Dec. 18, 1943   6 Sheets-Sheet 2
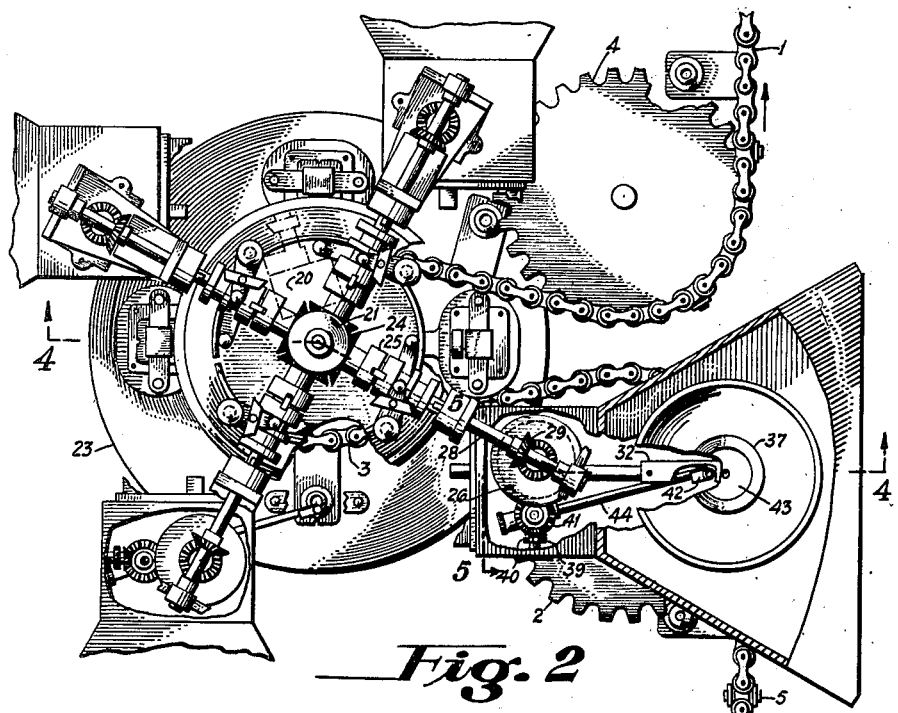
Fig. 2
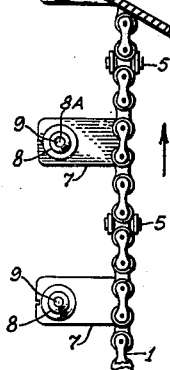
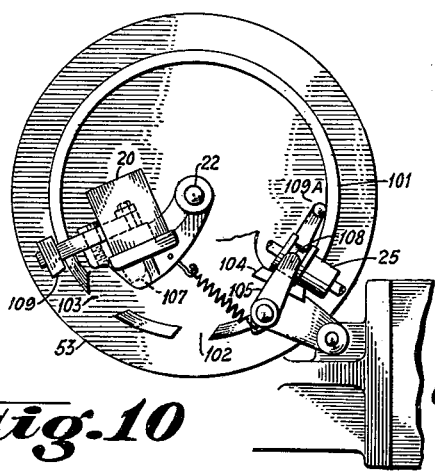
Fig. 10
INVENTOR.
Charles R. Johnson
BY
ATTORNEY July 2, 1946.  C. R. JOHNSON  2,403,286
DETONATOR LOADING MACHINE
Filed Dec. 18, 1943  6 Sheets-Sheet 3

Charles R. Johnson  INVENTOR.
BY Thos. A. Wilson
ATTORNEY

July 2, 1946.  C. R. JOHNSON  2,403,286
DETONATOR LOADING MACHINE
Filed Dec. 18, 1943  6 Sheets-Sheet 4

Charles R. Johnson INVENTOR.

BY Thos. A. Wilson

ATTORNEY

July 2, 1946.   C. R. JOHNSON   2,403,286
DETONATOR LOADING MACHINE
Filed Dec. 18, 1943   6 Sheets-Sheet 5

Charles R. Johnson INVENTOR.
BY Thos. A. Wilson
ATTORNEY

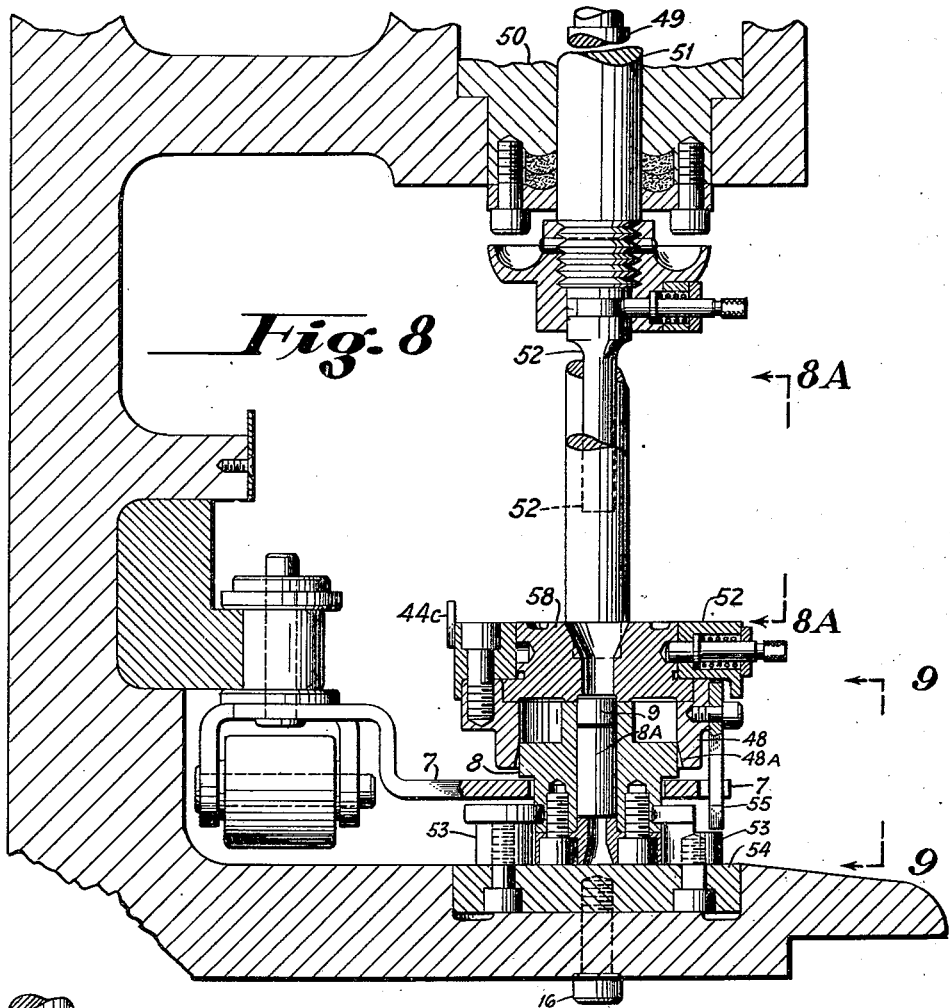
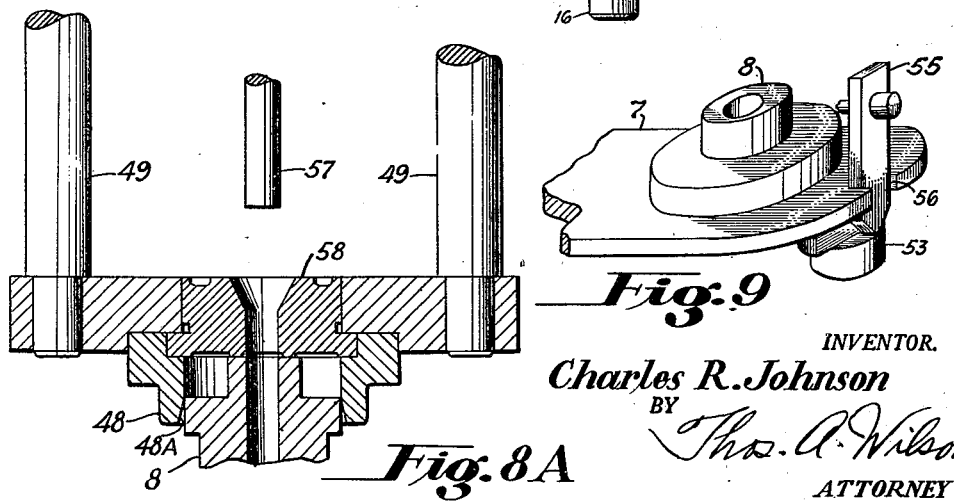

Patented July 2, 1946

2,403,286

UNITED STATES PATENT OFFICE 2,403,286

DETONATOR LOADING MACHINE

Charles R. Johnson, Glenn Mills, Pa., assignor to E. I. du Pont de Nemours & Company, Wilmington, Del., a corporation of Delaware Application December 18, 1943, Serial No. 514,746

3 Claims. (Cl. 86—27)

This invention relates to a machine for loading detonators such as blasting caps, military fuses, and the like. Mechanical loading of detonating compositions in the past has had only limited success due to the fact that intermittent motion was believed to be necessary for safety reasons. This, of course, cut down the rate of production to such an extent as to show little advantage over the methods approaching manual loading in nature.

The object of the present invention is to achieve absolutely continuous motion eliminating the necessity for intermittent or indexing type of motion usually used in the loading of detonating explosives into shells or cups as in the manufacture of blasting caps, military fuses, and the like. Other objects will appear in the following detailed description of the invention.

These objects have been achieved and the prior art difficulties overcome by providing an endless chain conveyor; spaced carriers on the chain to receive cup holders, which in turn hold the explosive containers, for instance the cups or shells; rotatable loading means; means for diverting said chain into a substantially circular path around said rotatable loading means whereby each shell holder assembly on said chain will be positioned and remain opposite a particular loading unit during the rotation of said loading means; and means for rotating the loading means in tempo with the passage of the carrier in the substantially circular path around the loading means to permit loading a charge of explosive in a shell in the chain shell holder during the period of rotation of the loading means along with the accompanying portion of the chain.

In other words, it is my invention to cause the loader to stay with the shell to be loaded throughout a substantially circular path and load the shell while rotating in this path. This permits a continuous and safe loading action without loss of motion. The loader unit upon leaving the loaded shell at the end of the path rotates immediately into position to work upon an empty shell entering the circular path.

A highly important feature of my invention is the alignment mechanism. The problem of alignment of the work heretofore has prevented the employment of an endless chain conveyor with any appreciable number of work stations in operations of the type wherein the positioning of the work is a crucial factor in the success of the operation. For instance, in loading operations generally, the work must be properly aligned for the work station to operate in filling the receptacle without spilling. This is even more important in operations for the loading of explosives in which the charge is pressed after it has been introduced into the shell. The slightest displacement of the press pin with respect to the charge and shell could result in a detonation.

In addition, with a long chain and a plurality of work stations, the inherent stretch in the chain is such that the methods and devices of the art have been incapable of providing alignment sufficiently satisfactory to permit the performance of work on articles carried by the chain at a plurality of stations. The greater the number of stations employed, the more serious becomes the problem of alignment. By means of the alignment mechanism included in my present invention, I have overcome these difficulties and made possible the employment of any number of work stations. This is accomplished in part by having the cup or shell fixed in the cup assembly and having the cup assembly floating in a carrier fixed on the endless chain conveyor so that the entire cup assembly is lined up by means of my alignment mechanism which will be described in greater detail in the following.

The invention will be understood more readily by referring to the accompanying drawings which disclose a preferred embodiment thereof.

Figure 2 is a plan view of the loading station.

Figure 8 is a detailed view of my alignment mechanism.

Figure 8a is a section of the same.

Figure 9 is a section of said mechanism taken along 9—9 of Figure 8.

Figure 10 is a section through 10—10 of Figure 4.

Figure 1:
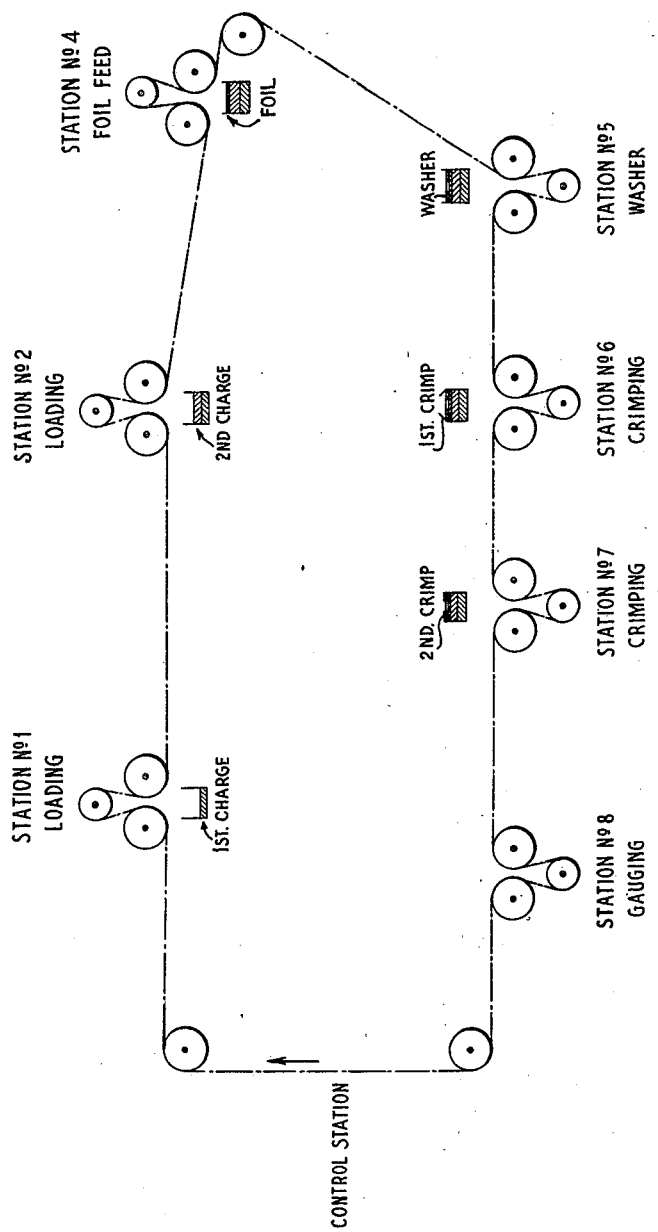
Figure 1 is a plan view of the machine showing the endless conveyor chain and a plurality of rotatable work stations for loading and performing other operations with respect to the shells carried on the chain, each work station rotating in a circular path.

Referring in detail to these various figures of the drawing, the machine as a whole includes the endless roller chain operating through the various turret stations as shown and described with legends in Figure 1. Each of the first five stations consists essentially of three main elements: a detection element, a loading turret, and an idler chain wheel unit. All three of these elements are operated by a driven endless roller chain 1 moving continuously and in simultaneous contact with the sprockets of the three elements. The centers of the three units are shown at the apexes of an isosceles triangle, the centers of the detection and idler elements being at the apexes formed by the base and the sides of such a hypothetical triangle. Stations 6, 7, and 8 have merely another idler wheel, each, in place of the complete detection element.

Figures 4, 5:
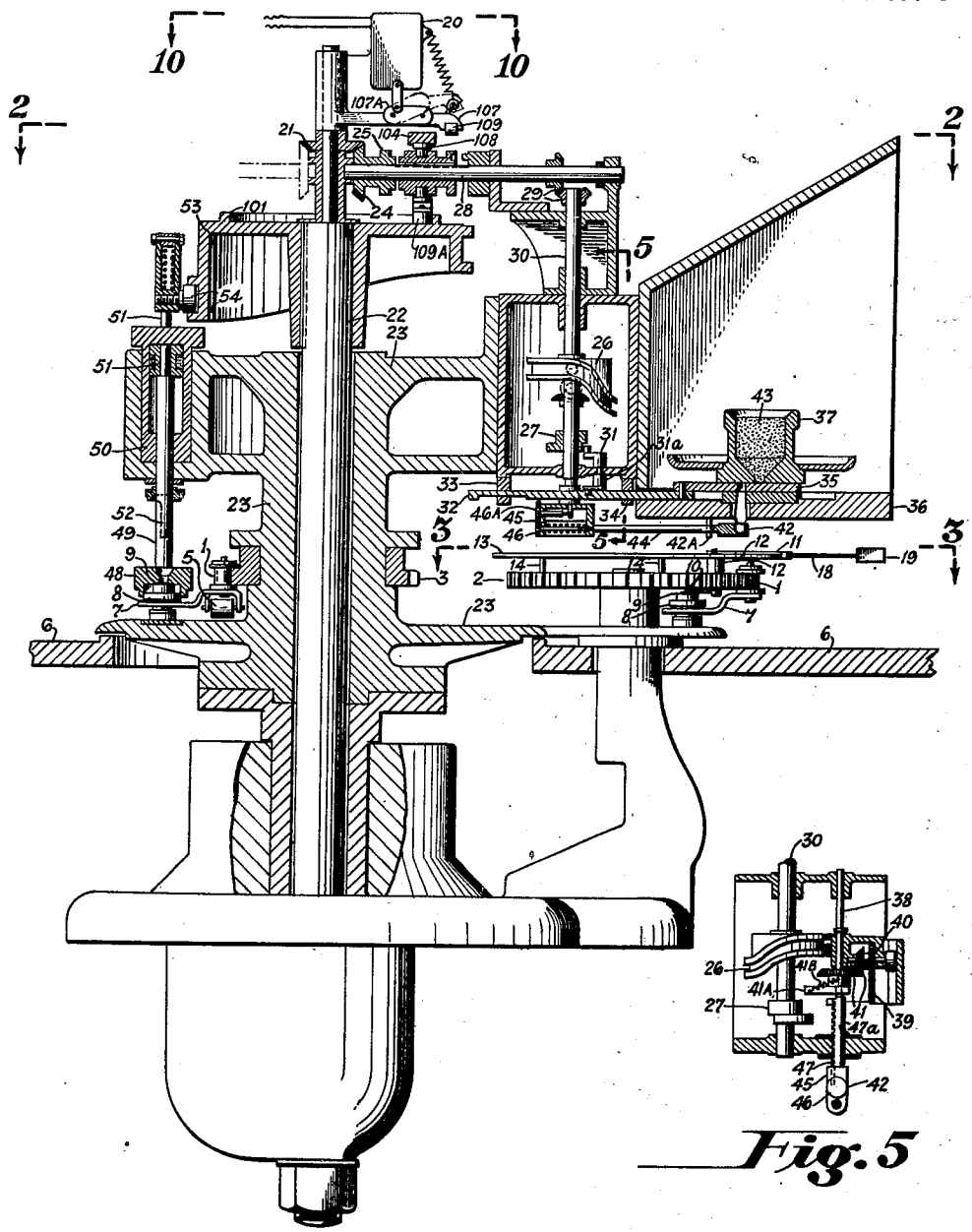
Figure 4 is a section of the plan taken along the line 4—4 of Figure 2.
Figure 5 is a section of the plan taken along the line 5—5 of Figure 2.

Referring in detail to Figure 2, the driven endless roller chain 1 moves continuously around sprocket 2 of the detection unit, imparting rotation thereto, and around sprocket 3 of the loading turret, imparting rotation to this element also and around sprocket 4 of the idler wheel, imparting rotation to said wheel. Attached to roller chain 1 and at predetermined distances are rollers 5 which support roller chain 1 as it moves across tape top 6 as shown in Figure 4. Also attached to roller chain 1 and at predetermined distances are fixed cup holder brackets or carriers 7. The cup holders 8 and the cups 9 are inserted by the operator in cup holder brackets 7 as the chain 1 moves toward the loading turret. The plunger 8a supports the shell or cap within the cup holder.

Figure 3:
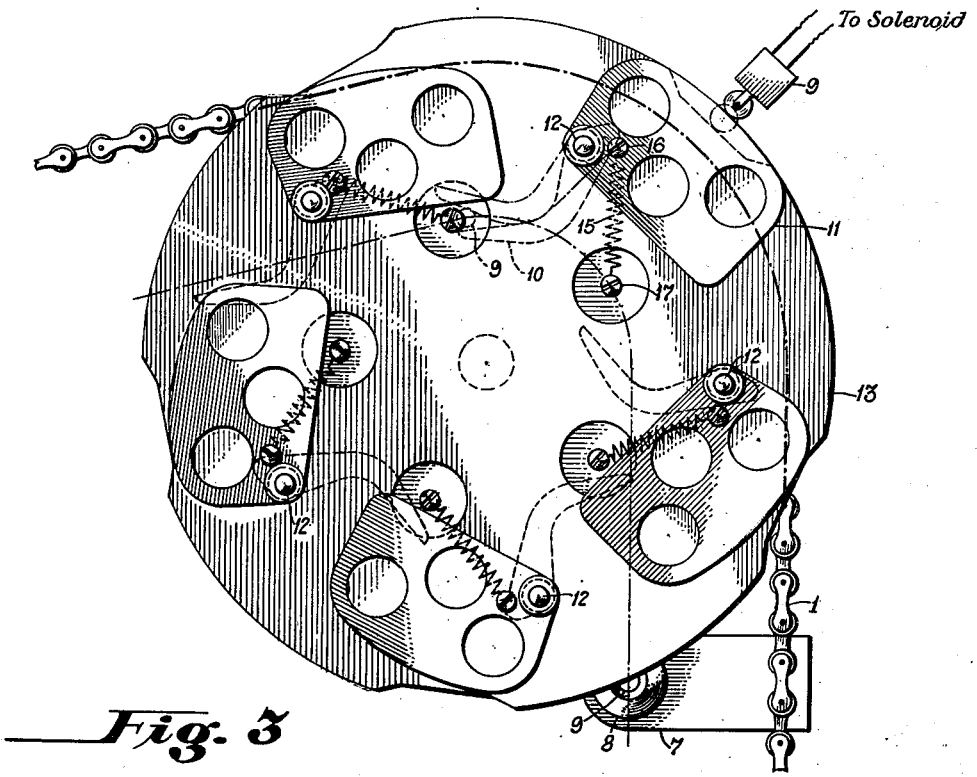
Figure 3 is a view of the detection unit.
Figure 3A:
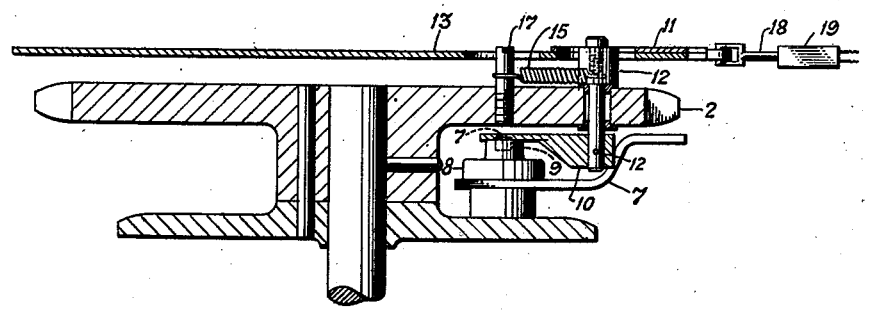
Figure 3a is a side view of the detection unit.

The cup holder 8 having in it cup 9 enters the detection sprocket, and the projection on cup 9 (Figure 3) interferes with cup feeler 10 causing it to rotate around shaft center 12. To shaft 12 is fastened a flag 11 which rotates outwardly and closes a corresponding gap in the switch control plate 13. The flag 11 remains in this position for that time in which cup 9 is in contact with feeler 10, and the chain is in engagement with the sprocket provided a cup is in the cup holder. The roller of a normally open micro switch rides upon the switch control plate, and as long as the flags are pivoted outward, this switch remains continuously closed.

The switch is directly connected to solenoid 20 (Figure 4), and as long as it remains closed, this solenoid is energized. To the solenoid is connected a lever 107 which in turn is pivoted on bracket 107a, and as long as the solenoid is energized, the opposite end of this lever carrying lug 109 is in a down position. As the turret rotates, the bar 104 of the clutch lever interferes with lug 109 and is caused to swing inward engaging the clutch teeth of clutch 25.

On clutch lever 105 a roller 109a is mounted which rides on the inside of the control ring 101 when the clutch is engaged. This prevents the clutch from working loose and causing the mechanism to get out of time. The clutch remains in engagement for 320° rotation of the turret. During this period the driven member of the clutch is caused to make one revolution. This is accomplished by the proper ratio of the beveled gears 21 and 24. After completing 320° of the revolution, the bar 104 on the clutch interferes with the fixed lug 107 (Figure 10) and causes the clutch lever 105 to swing outward and disengage the clutch. In swinging outward, the roller 109a is permitted to pass through the opening 102 in the control ring 101 and rides on the outside of the control ring for the remainder of the cycle.

The driven member 25 (Figure 4) of the clutch is spline keyed to the shaft 28 which in turn is miter geared by gears 29 to the vertical shaft 30. This shaft carries upon it two cams 26 and 27 which operate the powder-feeding mechanism. The powder-feeding mechanism operates through one complete cycle for every revolution of shaft 30. As shaft 30 begins to turn, cam lever 31 riding against cam 27 begins to move outward and moves the metering slide to which it is connected by means of block 31a and slide 32. Slide 32 is guided in guide posts 33 and 34 and is notched out so as to come to a definite stop when traveling in either direction. The metering plate has a hole in it of a calculated volume so that the desired quantity of powder can be measured and transferred from under the hopper to over the discharge point.

After the powder has been discharged from the metering plate, it drops into scoop 42. Scoop 42 is on the end of a long shaft 44 which in turn is geared to the driving mechanism for the scoop. Cam 26 as it revolves is so timed that, after the powder has been deposited in the scoop, it causes bracket on shaft 38 to move downward. Shaft 38 is straddled through this bracket by means of a collar on top and on the bottom by a lever 41a. It therefore also moves down as the bracket is lowered. In addition, it is rotated as it moves downward by means of the pinion and rack 40 and 39 and gear drive 41 which is connected by two springs 41b to lever 41a. As the shaft 38 rotates, it carries the small powder scoop mechanism around to a point where the scoop is directly over the funnel. Here the shaft 44 engages a definite stop 44c mounted on funnel plate (Figure 8), which prevents it from swinging. The vertical shaft 30 has still a quarter of an inch downward movement during which time rack 47 is hung up on plate 47a causing pinion 46 and gear 46a to rotate and in turn causing the powder scoop shaft 44 to rotate through 180°. The additional downward movement of shaft 38 without causing shaft 44 to swing is possible because of one of the springs 41b which during this time is stretched. Cam 26 then raises the vertical shaft 38, returning the powder scoop to its original position under the discharge spout where it engages a stop 42a mounted on bottom of hopper, thus permitting further vertical rise of scoop 42 without additional angular displacement.

It is at this part of the cycle that clutch 25 is mechanically disengaged and remains so until it has again interfered with lug 109 on the solenoid-operated lever. Should no cup be present in the cup holder when it enters the detecting station, solenoid 20 will become deenergized as the microswitch roller would then be permitted to enter the depression in the control plate. This point is so timed that the roller is in the depression a little before the clutch yolk would engage the lug 109. Due to the circuit being broken, the lever 107 is disengaged and the lug 109 is raised out of the way and cannot interfere with the block 104 on the clutch yolk. The clutch yolk therefore remains in an outward position, keeping the clutch disengaged after that particular cycle. In addition, the roller 109a now rides upon the outside of the control ring 101, and there is no possibility of the clutch becoming engaged due to vibration or any other cause.

I shall next describe the highly important alignment mechanism which is shown in detail in Figures 8, 9, and 10. Of greatest importance is the registering of the chain by the sprocket of the loading turret. This fixes what portion of the chain and the particular carrier thereat in relation to the particular loader unit on the turret. This relationship being established, the retainer 48 associated with the funnel and press pin mechanism 52 is lowered by guide rods 49 and, being interiorly beveled at 48a, feels for the top shoulder of the cup holder. This assures the alignment of the cup holder (floating in the carrier) with the funnel and press pin mechanism during the entire charging and pressing operation. Various auxiliary structures aid in the alignment.

The hold-down guides 53 fastened to the pressure disc 54 on the turret head serve to align the cup holder vertically and radially for the loading operation by aligning the bottom face of the cup plate holder with the upper surface of the pressure disc 54. This disc is fastened to the turret head by bolt 16. This arrangement also prevents lateral movement of the cup holder and aligns the latter in proper position with respect to the descending pilot 55 and retainer 48 associated with the funnel and press pin mechanism 52. The pilot fastened to the side of the funnel retainer 48 is lowered with the retainer and, by entering the groove 56 in the carrier 7, centers the carrier with the punch or press pin 52. The pilot, being pointed, feels its way into the groove 56 in the carrier 7 and serves to lock the same in proper relationship. The funnel has a slight amount of float with respect to the funnel housing and is beveled at the point where the cup enters it. This allows for any variation in concentricity between the cup and the cup holder. The funnel housing comes to rest on the top of the cup, causing a seal to exist between the funnel and the cup so as to prevent any powder falling on top of the cup holder. The press pin 52 has sufficient float in its holder so as to be capable of aligning itself with the funnel upon entering it. The downward motion of the funnel is obtained by means of a spring-loaded roller 57 riding in cam 53. The purpose of the spring loading is to take care of any variation in height that might exist in the vertical dimension of the cup. It also permits applying a definite pressure to the top of the cup where it is sealed by means of the countersink and bore in the funnel.

The actions of detection, aligning, loading, and pressing are accomplished while the cup holder is being carried by the chain around the detection unit and around the turret of the loading unit without the necessity of stopping, slowing, or changing in any way the smooth, even motion of chain 1.

Figure 6:
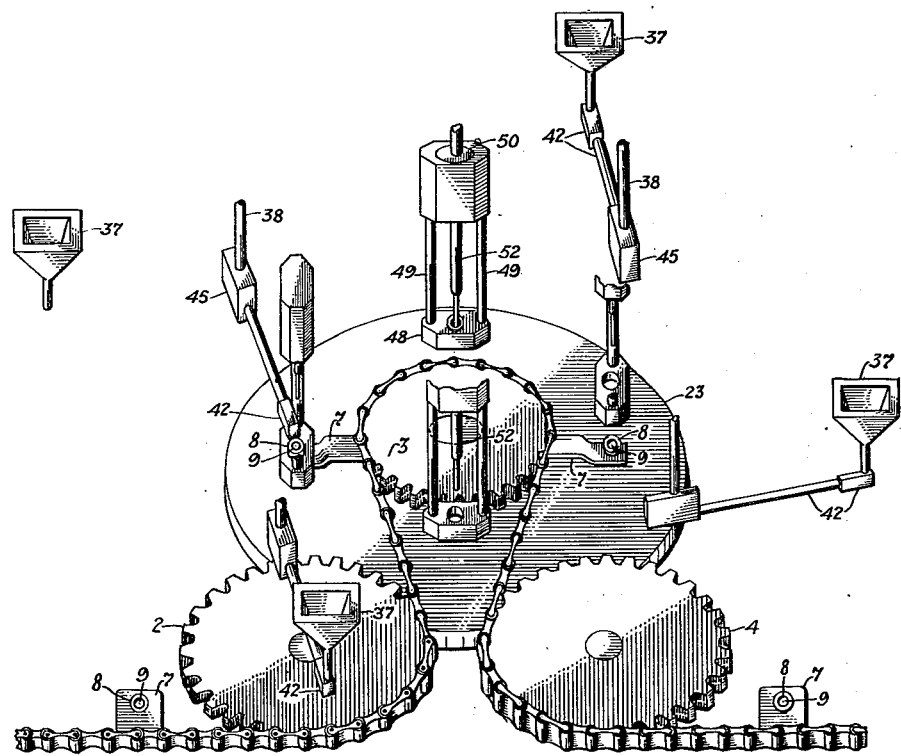
Figure 6 is a schematic view of parts of the loader showing the loading arm.
Figure 7:
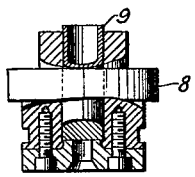
Figure 7 is a view of the cup containing the shell.

All of these actions and structures are simplified in Figures 6 and 7 which show ultimate working and structures of the cup and loader mechanism.

This invention is highly advantageous and useful for the rapid production of any type of explosively initiated unit such as blasting caps, military fuses, and the like. However, it should be understood that the principles of the invention are not limited to the explosive field which constitutes the highly preferred embodiment. In addition, the invention is applicable to any operation in which it is desirable to load a receptacle while the latter is in continuous motion or in which it is desirable to perform work upon a moving article without loss of motion by means of one or more working stations.

Accordingly, the invention is limited only by the following patent claims.

I claim:

1. A machine comprising a plurality of rotatable work stations, an endless chain conveyor with spaced work carriers thereon, work holding floating in said work carriers, means for diverting said chain into a substantially circular path around each of said rotatable work stations, means for registering a portion of the chain with a portion of the perimeter of said rotatable work station, alignment means for orienting the work holder with respect to the loading mechanism including means for supporting the work holder free from the work carrier, and means for centering said work holder with respect to said loading means.

2. In a machine of the type characterized by an endless chain conveyor, at least one carrier on said chain, rotatable loading means, and means for diverting said chain into a substantially circular path around said rotatable loading means; the elements comprising a work holder floating in said carrier, an alignment means for orientating said work holder with the loading means including means for supporting said work holder free from said carrier, and means for centering said work holder with respect to the loading means.

3. A machine for loading explosive units such as blasting caps, military fuses, and the like, which comprises an endless chain conveyor; at least one carrier on said chain; a work holder floating in said carrier to receive an explosive container; rotatable loading means including a turret head, a powder-feeding mechanism, and a pressing means; means for diverting said chain into a substantially circular path around said rotatable loading means; means for orientating said work holder with respect to said loading means including means for supporting said work holder free from the carrier, and means for centering said work holder with respect to the loading means and retaining said relationship substantially throughout the loading cycle; and means for rotating said loading means to permit loading a charge of explosive in a container in the holder during the period of rotation of the turret along with the particular portion of the chain bearing the carrier for said holder.

CHARLES R. JOHNSON.

Certificate of Correction

Patent No. 2,403,286. July 2, 1946.

CHARLES R. JOHNSON

It is hereby certified that errors appear in the printed specification of the above numbered patent requiring correction as follows: Column 3, line 25, for "tape" read *table*; column 4, line 2, for "cars" read *cams*; line 16, for "point" read *spout*; column 6, line 17, claim 1, for "holding" read *holders*; line 23, same claim, for "orienting" read *orientating*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*